US008248966B2

(12) United States Patent
Kim et al.

(10) Patent No.: US 8,248,966 B2
(45) Date of Patent: Aug. 21, 2012

(54) ADDRESS ASSIGNMENT METHOD AND TRANSMISSION METHOD OF MOBILE NODES FOR HIERARCHICAL ROUTING IN LOWPANS

(75) Inventors: Ki-Hyung Kim, Suwon-si (KR); Chae-Seong Lim, Anyang-si (KR)

(73) Assignee: Ajou University Industry-Academic Cooperation Foundation, Suwon-si, Gyeonggi-do (KR)

( * ) Notice: Subject to any disclaimer, the term of this patent is extended or adjusted under 35 U.S.C. 154(b) by 393 days.

(21) Appl. No.: 12/525,666

(22) PCT Filed: Feb. 4, 2007

(86) PCT No.: PCT/KR2007/000592
§ 371 (c)(1),
(2), (4) Date: Aug. 3, 2009

(87) PCT Pub. No.: WO2008/096910
PCT Pub. Date: Aug. 14, 2008

(65) Prior Publication Data
US 2009/0310519 A1    Dec. 17, 2009

(51) Int. Cl.
*H04L 12/28* (2006.01)
*H04L 12/56* (2006.01)
*H04W 4/00* (2009.01)
(52) U.S. Cl. .................. 370/254; 370/338; 370/389
(58) Field of Classification Search .......... 370/236–254, 370/311–351, 389–432; 709/223–238; 455/432–435
See application file for complete search history.

(56) References Cited

U.S. PATENT DOCUMENTS

| | | | | |
|---|---|---|---|---|
| 6,304,556 | B1 * | 10/2001 | Haas | 370/254 |
| 6,349,091 | B1 * | 2/2002 | Li | 370/238 |
| 6,959,009 | B2 * | 10/2005 | Asokan et al. | 370/475 |
| 6,980,524 | B1 * | 12/2005 | Lu et al. | 370/254 |
| 6,980,537 | B1 * | 12/2005 | Liu | 370/338 |
| 7,327,683 | B2 * | 2/2008 | Ogier et al. | 370/236 |
| 7,860,073 | B2 * | 12/2010 | Chen | 370/338 |
| 2004/0006712 | A1 | 1/2004 | Yao et al. | |
| 2004/0174904 | A1 | 9/2004 | Kim et al. | |
| 2007/0121613 | A1 * | 5/2007 | Clevy et al. | 370/389 |
| 2007/0258425 | A1 * | 11/2007 | Seo et al. | 370/338 |
| 2008/0031278 | A1 * | 2/2008 | Jang et al. | 370/475 |

* cited by examiner

*Primary Examiner* — Man Phan
(74) *Attorney, Agent, or Firm* — Sherr & Vaughn, PLLC

(57) ABSTRACT

An address assignment method of a mobile node, for hierarchical routing in a low-power wireless personal area network (LoWPAN), includes (a) classifying a plurality of fixed nodes in a hierarchical way, (b) designating a management node and a head node of a lower level than the level of the management node in the fixed nodes, (c) determining if the mobile node can communicate with the head node, and (d) assigning an address to the mobile node through a neighboring head node, which can communicate with the mobile node when the mobile node cannot communicate with the head node. Therefore, addresses may be assigned without limitation until the addresses for the mobile nodes are exhausted. Furthermore, even when the mobile node having an assigned address from a first region moves from the first region to a second region, the packet may be sent or received through the hierarchical routing.

18 Claims, 7 Drawing Sheets

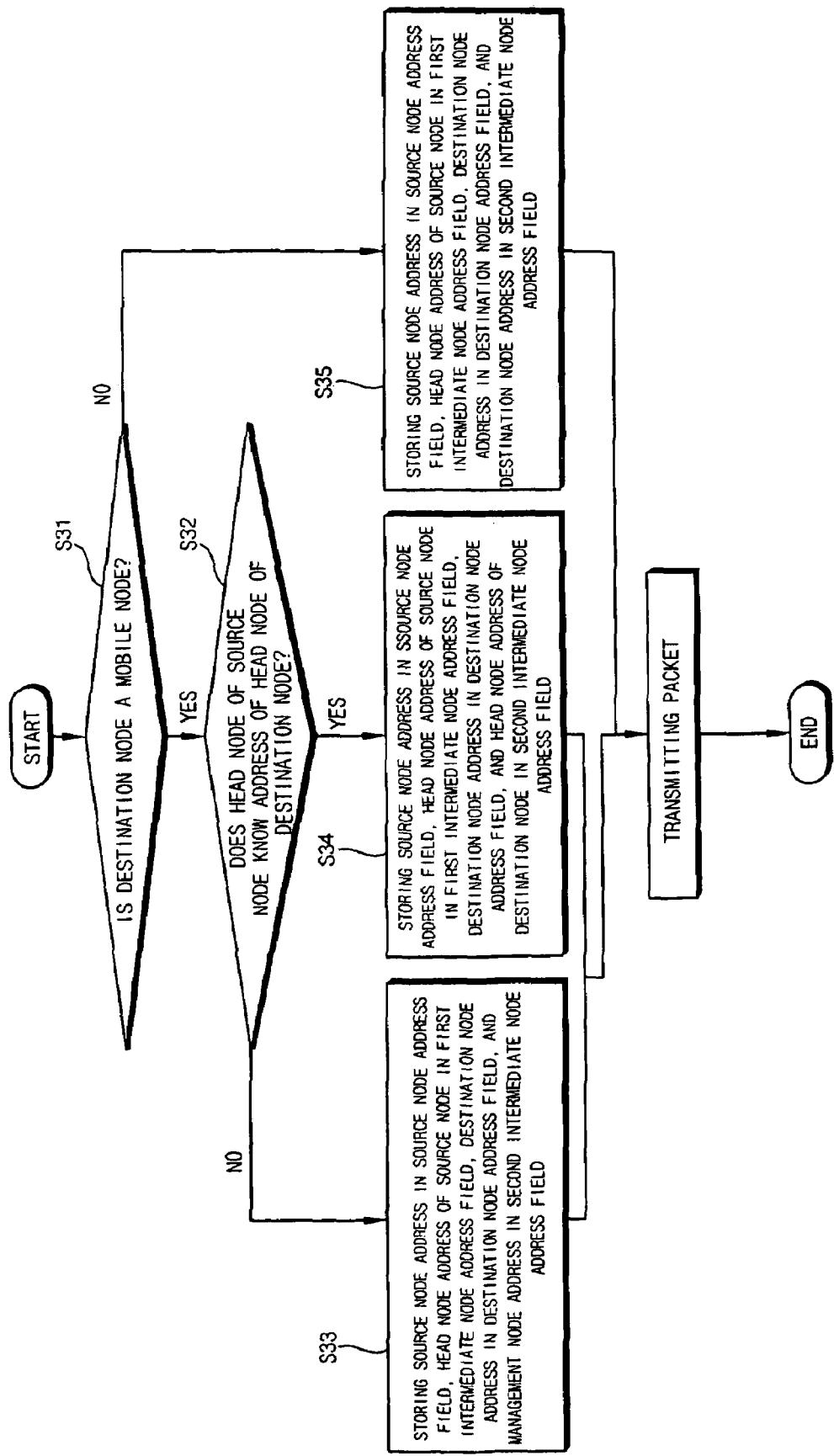

ADDRESS ASSIGNMENT METHOD AND TRANSMISSION METHOD OF MOBILE NODES FOR HIERARCHICAL ROUTING IN LOWPANS

CROSS REFERENCE TO PRIOR APPLICATION

The present application is a National Stage Application of PCT International Application No. PCT/KR2007/000592 (filed on Feb. 4, 2007), under 35 U.S.C. 371, which is hereby incorporated by reference in its entirety.

TECHNICAL FIELD

The present invention relates to an address assignment method and a packet transmission method in a network, and more particularly to an address assignment method and a packet transmission method of a mobile node for hierarchical routing in a low-power wireless personal area network (LoWPAN).

BACKGROUND ART

Generally, in comparison with a local area network (LAN) or a wide area network (WAN), a personal area network (PAN) allows each person to have his own network. For example, the PAN may be applied to various fields such as a wireless sensor network, a home network, etc. In order to embody the PAN through a wireless method, a low-power wireless personal area network (LoWPAN) has been standardized in accordance with IEEE 802.15.4-2003, in addition to a high-speed wireless personal area network (WPAN) in accordance with IEEE 802.15.3.

An interface identifier of a LoWPAN device is based on EUI-64 (or EUI64). The interface identifier may be used for making a routing table for multi-hop routing in the LoWPAN.

Considering the limited functions of the LoWPAN device, such as low power, limited memory space, small packet size, etc., usage of the on-demand multi-hop routing may be limited. Additionally, when many devices are applied to the LoWPAN, using the routing table becomes difficult. That is, the on-demand multi-hop routing method may set an effective path in an ad-hoc network or a mesh-type wireless network, but the on-demand multi-hop routing method requires each node to employ a routing table. However, the LoWPAN device has limited memory space in general, so that it is difficult to build a routing table.

In order to solve the above-mentioned problem, a hierarchical routing method has been developed. However, according to a conventional hierarchical routing method, new nodes are concentrated to a specific position. Therefore, when the new nodes require network participation, address spaces for allocating the new nodes are limited. Therefore, a portion of the new nodes may not participate in the network even though used address spaces do not exceed the total amount of the network.

Furthermore, when a mobile node moves to another position with an address received from a specific node, it may not be possible to transfer a packet to the mobile node through the hierarchical routing. Additionally, it may not be possible to distinguish a temporary node, which temporarily participates in the network, from nodes, which have been already built, to induce problems for building routing paths and other control problems.

DISCLOSURE OF THE INVENTION

Technical Problem

The present invention provides an address assignment method for assigning an address of a mobile node for hierarchical routing in a low-power wireless personal area network (LoWPAN).

The present invention also provides a packet transmission method for hierarchical routing in the LoWPAN.

Technical Solution

An exemplary address assignment method of a mobile node, for hierarchical routing in a LoWPAN includes (a) classifying a plurality of fixed nodes in a hierarchical way, (b) designating a management node and a head node of a lower level than the level of the management node in the fixed nodes, (c) determining if the mobile node can communicate with the head node, and (d) assigning an address to the mobile node through a neighboring head node, which can communicate with the mobile node when the mobile node cannot communicate with the head node.

The exemplary address assignment method may further include the following steps when the mobile node can communicate with the head node in step (c), allowing the mobile node to request network participation approval from the head node, allowing the head node to request an address of the mobile node to the management node, allowing the management node to assign the address of the mobile node to the head node and allowing the head node to approve network participation of the mobile node.

According to the above address assignment method, step (d) may include requesting network participation approval from the neighboring head node, allowing the neighboring head node to request a change of the head node of the mobile node to the management node, allowing the management node to approve the change of the head node and to assign an address of the mobile node, and allowing the neighboring head node to approve network participation of the mobile node.

According to the above address assignment method, the neighboring head node and the head node may be disposed on the same level. Additionally, the neighboring head node and the head node may be in charge of at least one mobile node.

According to the above address assignment method, the mobile node may be disposed on a lower level than the head node to be divided from an address field of the fixed node.

According to the above address assignment method, Internet Protocol (IP) addresses of the management node, the head node and the mobile node may be based on Internet Protocol version 6 (IPv6).

An exemplary packet transmission method of a mobile node for hierarchical routing in a LoWPAN, includes (a) classifying a plurality of nodes in a hierarchical way, (b) designating a management node and a head node of a lower level than the level of the management node in the fixed nodes, (c) determining if the mobile node can communicate with the head node, (d) assigning an address to the mobile node through a neighboring head node, which can communicate with the mobile node when the mobile node cannot communicate with the head node, and (e) allowing the mobile node to send a packet through the neighboring head node.

The exemplary packet transmission method may further include the following steps when the mobile node can communicate with the head node in step (c), allowing the mobile node to request network participation approval from the head node, allowing the head node to request an address of the mobile node from the management node, allowing the management node to assign the address of the mobile node to the head node, allowing the head node to approve network participation of the mobile node, and allowing the head node to send the packet through the head node.

Step (d) may include requesting network participation approval from the neighboring head node, allowing the neighboring head node to request a change of the head node of the mobile node to the management node, allowing the management node to approve the change of the head node and to assign an address of the mobile node, and allowing the neighboring head node to approve network participation of the mobile node.

According to the packet transmission method, the packet may have four address fields when the mobile node is at least one of a source node and a destination node. For example, the four fields may include a source node address field, a first intermediate node address field, a destination node address field and a second intermediate node address field.

BRIEF DESCRIPTION OF THE DRAWINGS

The above and other advantages of the present invention will become more apparent by describing example embodiments thereof in detail with reference to the accompanying drawings, in which:

FIG. 11 is a flowchart illustrating a process through which a packet that is transmitted from a mobile node is retransmitted from a head node.

BEST MODE FOR CARRYING OUT THE INVENTION

Figure 1:
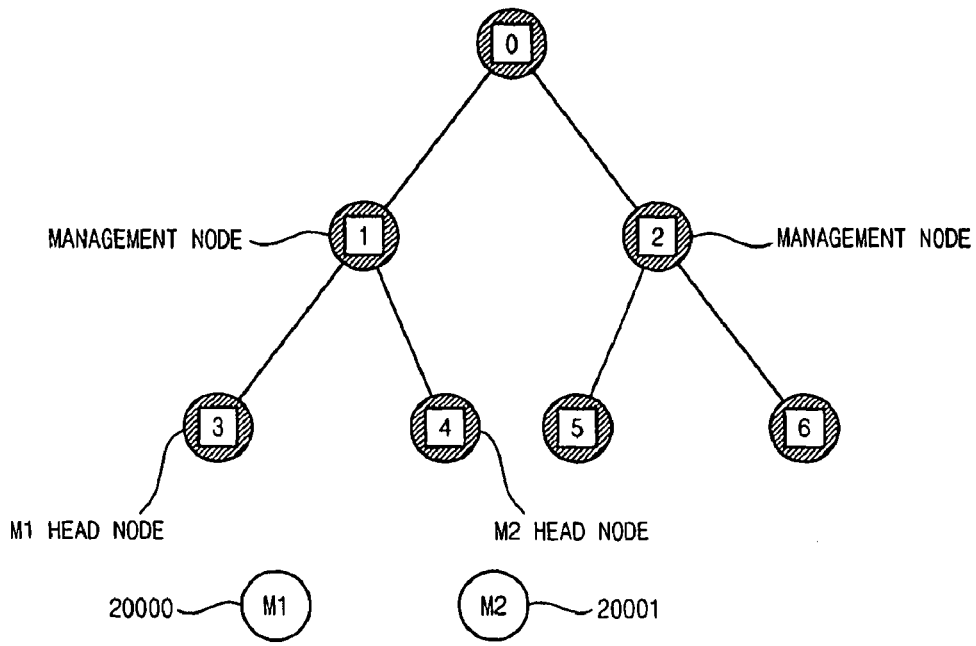
FIG. 1 is a diagram illustrating an entire network according to an exemplary embodiment of the present invention.

Embodiments of the present invention now will be described more fully with reference to the accompanying drawings, in which embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating an entire network according to an exemplary embodiment of the present invention.

Referring to FIG. 1, an entire network according to an exemplary embodiment of the present invention includes a plurality of transmission nodes for hierarchical routing in a low-power wireless personal area network (LoWPAN). The transmission nodes includes, for example, management nodes 1 and 2, head nodes 3, 4, 5 and 6, and mobile nodes M1 and M2.

For example, each of the hatched circles correspond to a fixed node using the hierarchical routing that uses dynamic assignment of short 16-bit addresses, and numbers in the hatched circles correspond to addresses. A method of assigning an address to the fixed node is substantially the same as the conventional method.

According to the present embodiment, the fixed node has a tree structure with a maximum of two child nodes and a depth of three. The mobile nodes M1 and M2 have addresses of 20000 and 20001, respectively. The addresses of the mobile nodes M1 and M2 use lower spaces of an address space so that the addresses of the mobile nodes M1 and M2 uses larger spaces than the addresses of the fixed nodes. For example, the mobile node uses address spaces from 20000 to 65535.

Addresses for the fixed nodes are assigned to the fixed nodes according to conventional hierarchical routing, but addresses for the mobile nodes are assigned to the mobile nodes from the management nodes. The number of the management nodes may be greater than or equal to one, and the management nodes may be a coordinator or a child node of the coordinator. When the number of the management nodes is greater than one, each of the management nodes is assigned its own address space, and the addresses are fixed thereto in the network. For example, the addresses fixed to the management nodes may be determined through a sectional address management method or an address management method using hashing.

Each of the mobile nodes M1 and M2 has a fixed node as head nodes 3, 4, 5 and 5. In other words, one of the fixed nodes may be a head node of the mobile nodes M1 and M2. The head nodes 3, 4, 5 and 6 operate as a bridge. In detail, the head nodes 3, 4, 5 and 6 connect the mobile nodes M1 and M2 to other nodes of the network. When communication between the mobile nodes M1 and M2 and the head nodes 3, 4, 5 and 6 becomes impossible, another head node is selected, and an address bundle of the mobile nodes M1 and M2 and the head nodes 3, 4, 5 and 6 are managed by the management nodes 1 and 2.

Figure 2:
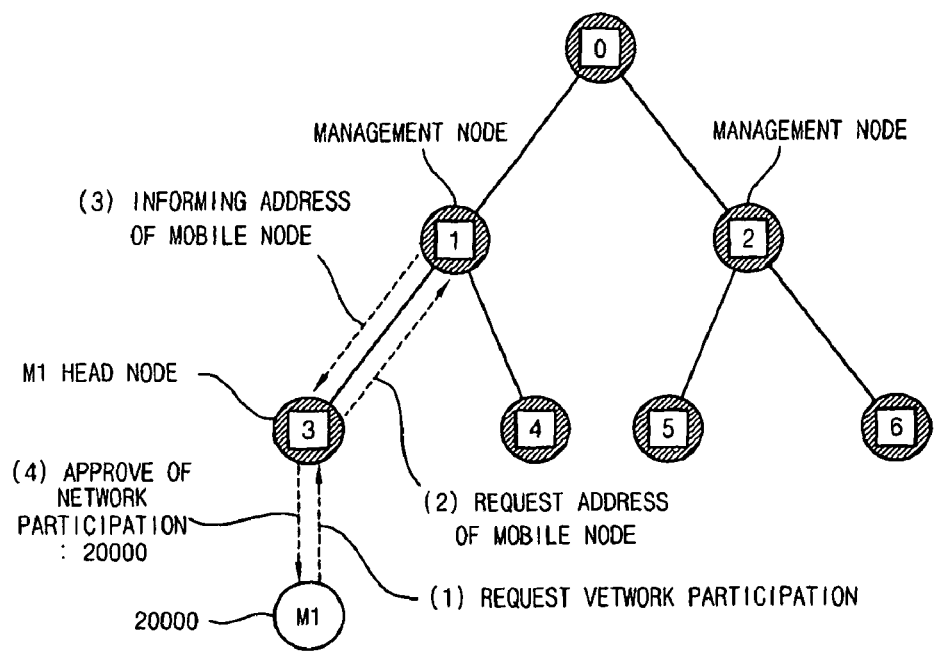
FIG. 2 is a diagram illustrating a process through which a mobile node participates in the network in FIG. 1 and an address is assigned.

FIG. 2 is a diagram illustrating a process through which a mobile node participates in the network in FIG. 1 and an address is assigned.

Referring to FIG. 2, a process through which mobile nodes M1 and M2 participate in the network is as follows.

At first, a new mobile node M1 requests network participation to the fixed node 3. When the fixed node 3 receives the request from the new mobile node M1, the fixed node 3 requests a new address for the mobile node M1 to the management node 1. Then, the management node 1 informs the fixed node 3 of a new address 20000. When the fixed node 3 receives the new address 20000, the fixed node 3 informs the new mobile node M1 of the new address and allows the mobile node M1 to participate in the network.

Therefore, the node that receives the participation request of the new mobile address becomes the head node 3, and the management node 1 stores address bundle of the node that receives the participation request and the new mobile node when the management node receives the participation request of the new mobile node.

Figure 3:
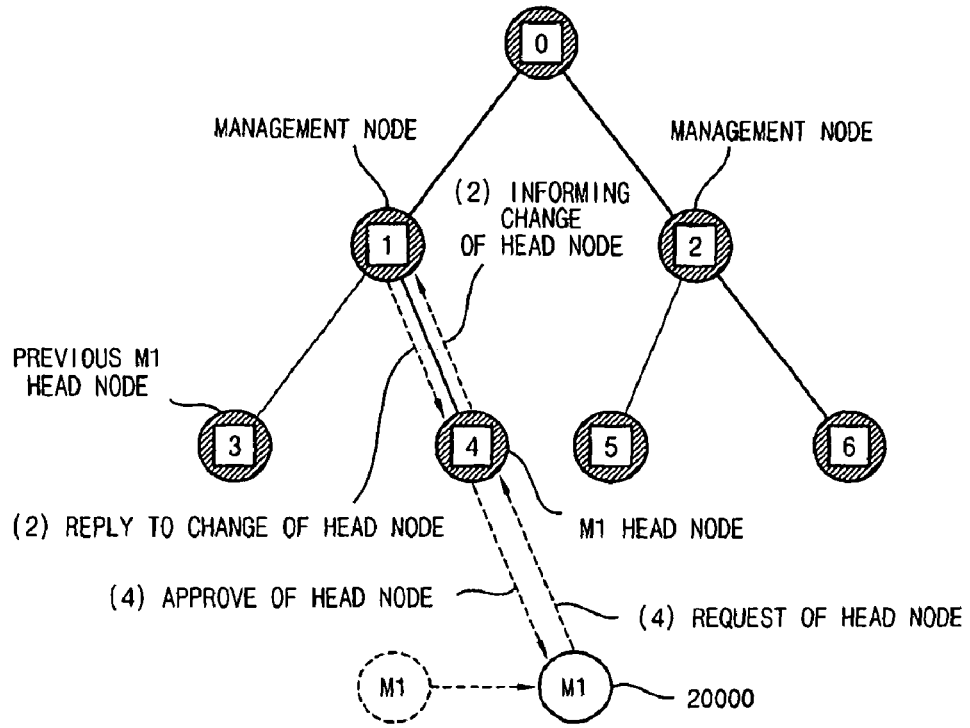
FIG. 3 is a diagram illustrating a process through which a head node is changed when the mobile node in FIG. 2 cannot communicate with the head node.

FIG. 3 is a diagram illustrating a process through which a head node is changed when the mobile node in FIG. 2 cannot communicate with the head node.

Referring to FIG. 3, when communication between the mobile node M1 and the head node 3 is impossible due to moving of the mobile node M1 or instability of a communication environment, a new head node is selected. The mobile node M1 that wants to select the new head node scans fixed nodes disposed near the mobile node M1 and searches for a suitable head node. When a plurality of suitable fixed nodes is detected, a method for selecting one of the suitable fixed nodes will be explained. For example, the one suitable fixed node may be selected through an intensity of received radio waves.

In detail, when the mobile node M1 selects the suitable fixed node 4, the mobile node M1 sends a message for requesting a head node to the selected suitable fixed node 4. When the suitable fixed node 4 receives the message, the suitable fixed node 4 sends a message to inform the management node 1 of the address of the mobile node M1 and the address of the suitable fixed node 4, so that the management node stores the address bundle of the mobile node M1 and the new head node 4. When the management node 1 stores the address bundle of the mobile node M1 and the new head node 4, the management node 1 sends a reply for changing the head node to the new head node 4. Then, the new head node 4 sends an allowance message to the mobile node M1.

Therefore, when communication between the mobile node M1 and the head node 3 is impossible due to moving of the mobile node M1 or instability of communication environment, the mobile node M1 may participate in the network through recommunicating with other fixed nodes. As a result, even the mobile node M1, which is movable, may stably participate in the network.

Figure 4:
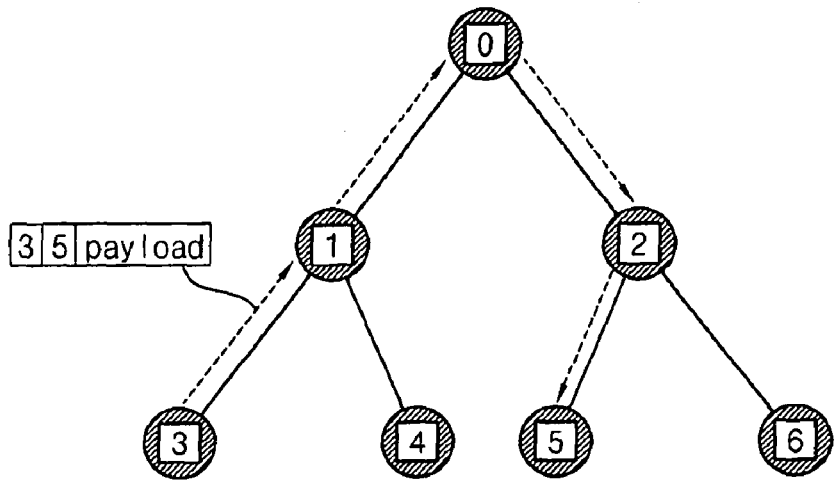
FIG. 4 is a diagram illustrating a process through which one fixed node transmits a packet to another fixed node.

FIG. 4 is a diagram illustrating a process through which one fixed node transmits a packet to another fixed node.

Referring to FIG. 4, according to the conventional process through which a packet is transmitted, the node that wants to send a packet is the node 1, and a destination node is the node 5. The addresses of the nodes 1 and 5 are contained in the header of the packet.

Figure 5:
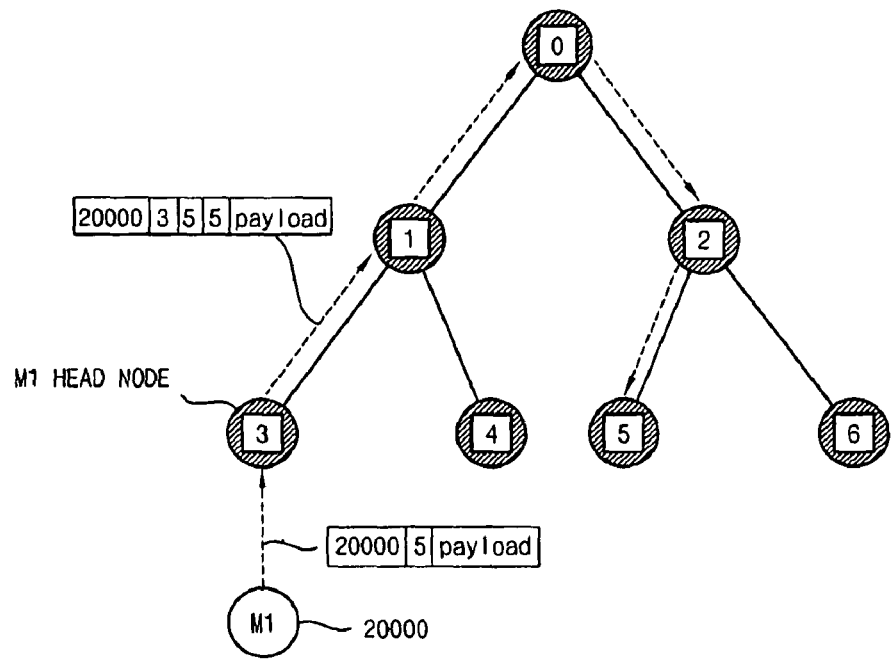
FIG. 5 is a diagram illustrating a process through which a mobile node transmits a packet to a fixed node.

FIG. 5 is a diagram illustrating a process through which a mobile node transmits a packet to a fixed node.

Referring to FIG. 5, the packet according to an exemplary embodiment of the present invention includes an address field at a header of the packet. Especially, when the mobile node is one of the source node or a destination node, the header of the packet includes four address fields. For example, the four address fields contain an address of the source node, an address of a first intermediate node, an address of the destination node and an address of a second intermediate node.

For example, the mobile node M1 that wants to send a packet to the fixed node 5, which corresponds to the destination node, sends the packet, of which the header contains the address 20000 of the mobile node M1 and the address 5 of the fixed node 5, to the head node 3 that corresponds to the first intermediate node. The head node 3 that receives the packet adds its own address 3 and the address 5 of the fixed node 5, which corresponds to the destination node, to the header of the packet and sends the packet having the address 3 of the first intermediate node and the address 5 of the destination node attached thereto to the management node 1.

The added address fields correspond to the first intermediate node and the second intermediate node. However, when the source node or the destination node is the fixed node, the address of the source or the destination node is attached again as one of the first or second intermediate nodes in order to maintain consistent two or four address fields. The destination node that receives the packet may selectively use the address bundle of the source node and the head node as local information through the address of the source node and the first intermediate node contained in the header. The lifetime of the address bundle of the source node and the head node is not explained in detail. However, considering the mobility of the mobile node, the address bundle having too long of a lifetime is not preferable.

Figure 6:
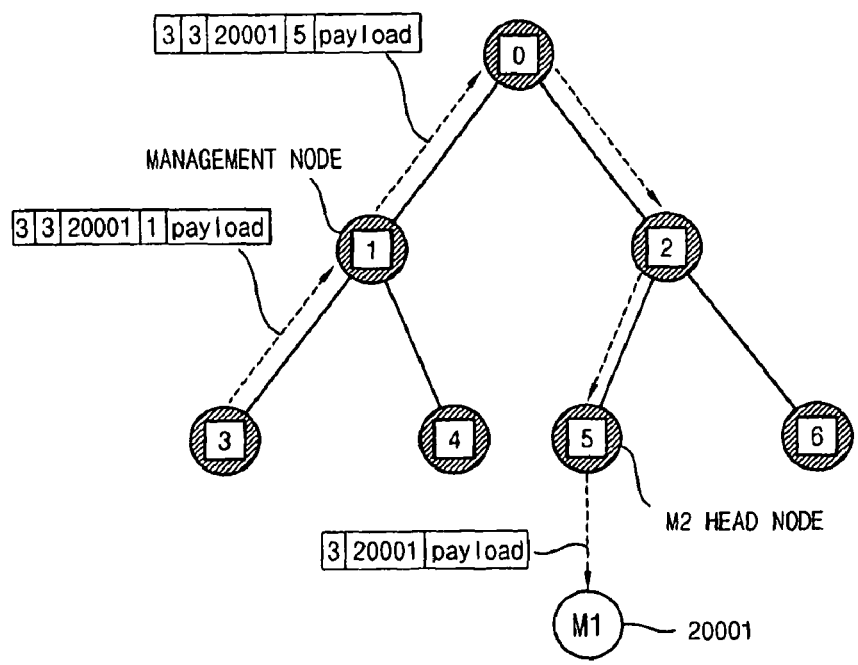
FIGS. 6 and 7 are diagrams illustrating processes through which a fixed node transmits a packet to a mobile node.
Figure 7:
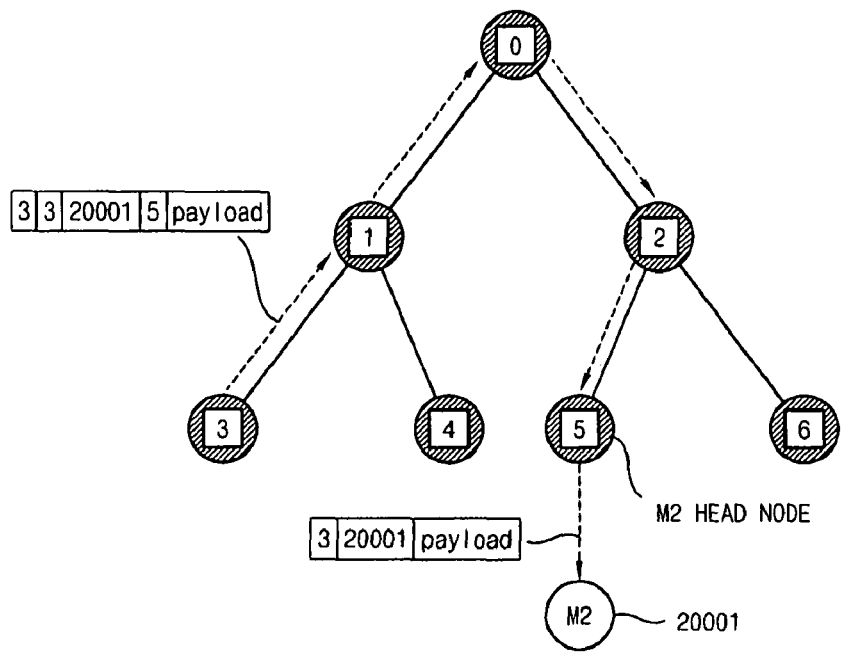

FIGS. 6 and 7 are diagrams illustrating processes through which a fixed node transmits a packet to a mobile node. FIG. 6 corresponds to a case in which a fixed node does not have the address bundle of the destination mobile node and the head node of the destination mobile node. FIG. 7 corresponds to a case in which a fixed node has the address bundle of the destination mobile node and the head node of the destination mobile node.

Referring to FIG. 6, when the management node 1 does not know the head node 5 of the destination mobile node M2, the address 3 of fixed node is contained in the address fields of the source node and the first intermediate node, and the address 20001 of the destination mobile node and the address 1 of the management node are respectively contained in the address fields of the destination node and the second intermediate node. The node from the fixed node arrives at the management node using hierarchical routing that uses 16-bit short address dynamic allocation.

The management node 1 that receives the packet searches for the address bundle of the destination node M2 and the head node 5, stores the bundle in the address field of the second intermediate node, and resends the packet. The packet from the management node 1 is transmitted to the head node 5 of the mobile node M2 using the hierarchical routing.

The head node 5 of the destination mobile node M2 removes the first intermediate node field and the second intermediate node field from the packet, and sends the packet not having the first intermediate node field and the second intermediate node field to the mobile node M2.

Referring to FIG. 7, the fixed node 3 searches for the address bundle of the destination mobile node M2 and the head node 5 and attaches the address of the head node of the destination mobile node M2 to the packet and sends the packet having the address of the head node attached thereto. The above process is substantially the same as in FIG. 6.

Figure 8:
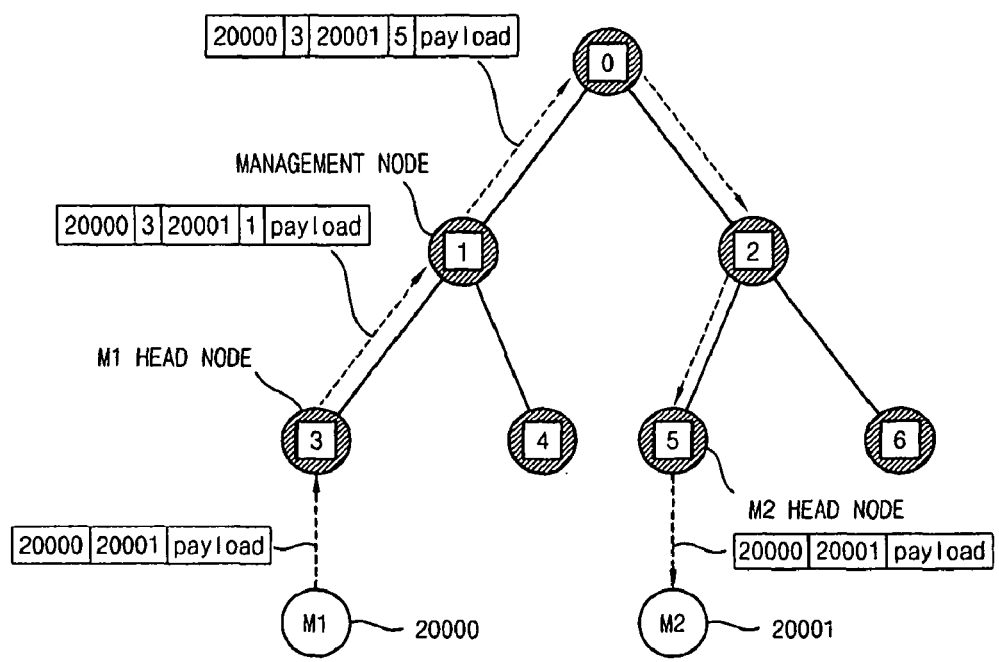
FIGS. 8 and 9 are diagrams illustrating processes through which a mobile node transmits a packet to another mobile node.
Figure 9:
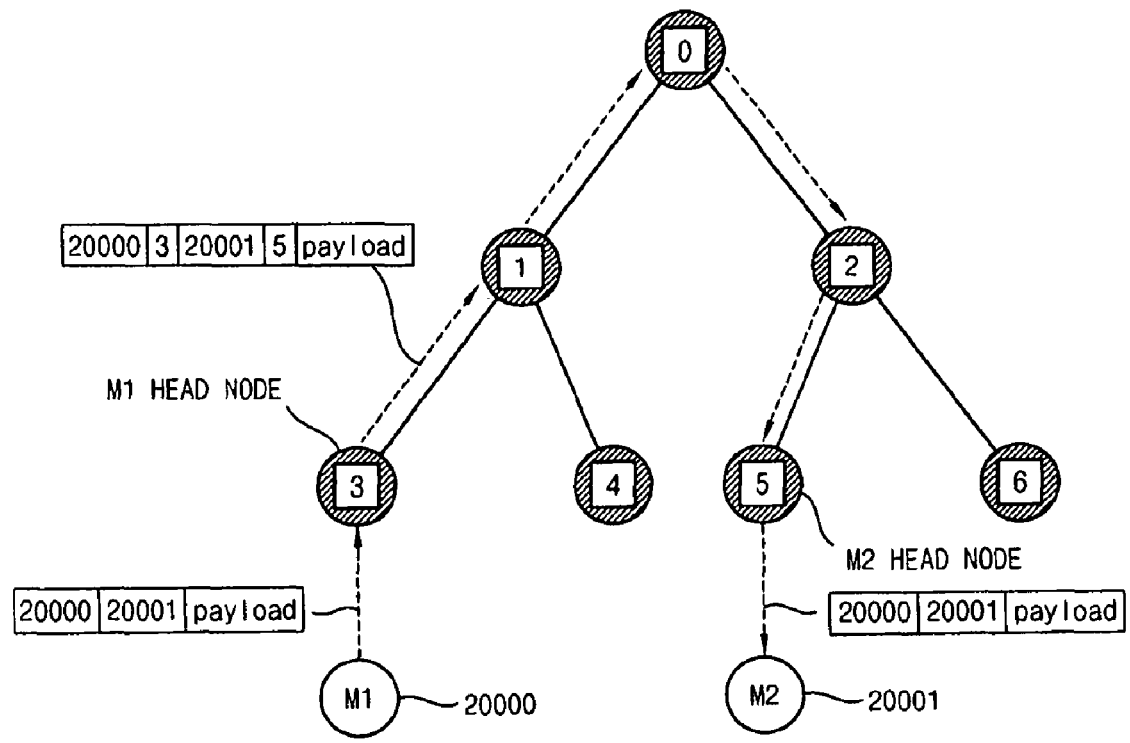

FIGS. 8 and 9 are diagrams illustrating processes through which a mobile node transmits a packet to another mobile node. FIG. 8 corresponds to a case in which the head node of the source mobile node does not have the address bundle of the address of the destination mobile node and the head node of the destination mobile node. FIG. 9 corresponds to a case in which the head node of the source mobile node has the address bundle of the address of the destination mobile node and the head node of the destination mobile node.

Referring to FIGS. 8 and 9, the source node is a mobile node M1, and the destination node is also a mobile node M2. The source mobile node M1 sends a packet having a header containing the address 20000 of the source mobile node M1 to the head node 3 of the source mobile node M1. The subsequent process performed by the head node is substantially the same as in FIGS. 6 and 7. The head node of the destination node stores the address of the source address field and the first intermediate node to use the stored address as the local information as described in FIG. 5.

Figure 10:
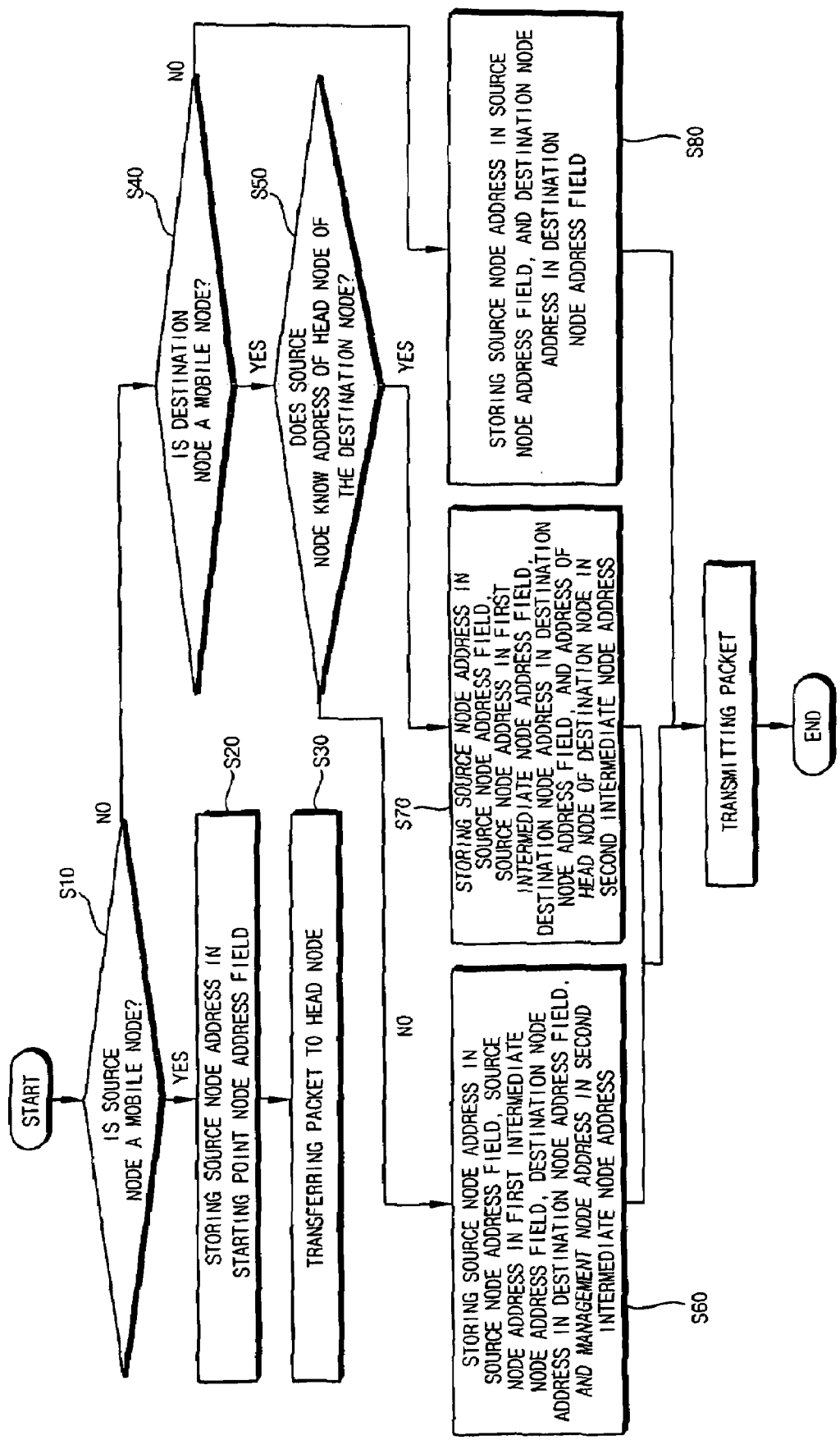
FIG. 10 is a flowchart illustrating a process through which a packet is transmitted from a source node.

FIG. 10 is a flowchart illustrating a process through which a packet is transmitted from a source node.

Referring to FIG. 10, in a packet transmission method for hierarchical routing in the LoWPAN, the source node determines if the source node is a fixed node or a mobile node (step S10).

When the source node is a mobile node, the source node stores the address of the source node in the source address field, and stores the address of the destination node in the destination address field (step S20), and sends the packet having the source node address and the destination node address stored therein to the head node of the source node (step S30). A process, through which the head node receiving the packet having the source node address and the destination node address stored therein send the packet to the destination node, will be explained referring to FIG. 11.

When the source node is a fixed node, the source node determines if the destination point node is a fixed node or a mobile node (step S40).

When the destination node is a mobile node, the source node searches for the address bundle of the destination node address and the head node address (step S50).

When the source node does not have the bundle, the source node stores the source node address in the source node address field and the first intermediate node address field, stores the destination node address in the destination node address fields, stores the management node address in the second intermediate node address field, and sends the packet (step S60). When the source node has the bundle, the source node stores the address of the head node of the destination node in the second intermediate node (step S70).

When the destination node is a fixed node, the source node stores the address of the source node in the source node address field, and the address of the destination node in the destination node address field (step S80).

FIG. 11 is a flowchart illustrating a process through which a packet that is transmitted from a mobile node is retransmitted from a head node.

Referring to FIG. 11, when the source node is a mobile node, the source node stores the address of the source node in the source node address field and stores the address of the destination node in the destination node address field, and sends the packet to the head node of the source node. Then, the destination node of the packet from the source mobile node is determined if the destination node is mobile node or a fixed node (step S31).

When the destination node is a mobile node, the head node searches for the bundle of the address of the destination node and the address of the head node of the destination node (step S32).

When the head node does not have the bundle, the head node stores the address of the source node in the source node address field, stores the address of the head node in the first intermediate node address field, stores the address of the destination node in the destination node address field, and stores the address of the management node in the second intermediate node address field, and send the packet (step S33). When the head node has the bundle of the destination node address and the head node address, the head node stores the address of the head node of the destination node in the second intermediate node address field (step S34).

Additionally, when the destination node is a fixed node, the head node stores the address of the destination node in the second intermediate node address field (step S35).

The present invention may be embodied through computer-readable program code stored in a computer-readable medium. The computer-readable medium includes all kinds of devices storing computer-readable data, for example, read-only memory (ROM), random access memory (RAM), a compact disc read-only memory (CD-ROM), a magnetic tape, a floppy disk, optical data storage devices, etc. Additionally, the computer-readable medium may be embodied through a carrier wave (for example, a transmission through the Internet). Furthermore, the computer-readable medium may be divided and stored in computer systems connected through a network so that the computer-readable code may be separately stored, and executed. A functional program, code and code segments for performing the present invention may be easily applied by a person having ordinary skill in the art.

The present invention is explained referring to figures, but the figures are only examples. Having described the exemplary embodiments of the present invention and its advantages, it is noted that various changes, substitutions and alterations can be made herein without departing from the spirit and scope of the invention as defined by appended claims.

INDUSTRIAL APPLICABILITY

As described above, according to the present invention in the address assignment method and the packet transmission method for hierarchical routing in a low-power wireless personal area network (LoWPAN), even when new nodes concentrated in a specific region requires network participation, addresses may be assigned without limitation until the addresses for mobile nodes are exhausted.

Furthermore, even when a mobile node having an assigned address from a first region moves from the first region to a second region, a packet may be sent or received through the hierarchical routing. Additionally, address fields of a fixed node and a mobile node are separate, so that network operations such as routing may also be separate.

While the present invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims.

The invention claimed is:

1. An address assignment method of a mobile node, for hierarchical routing in a low-power wireless personal area network (LoWPAN), comprising:
   (a) classifying a plurality of fixed nodes in a hierarchy;
   (b) designating a management node and a head node among the fixed nodes, the head node having a lower level than the level of the management node;
   (c) determining if a mobile node can communicate, with the head node; and
   (d) assigning an address to the mobile node through a neighboring head node, which can communicate with the mobile node, when the mobile node cannot communicate with the head node,
   wherein the address assignment method further comprises the following steps when the mobile node can communicate with the head node in step (c):
   allowing the mobile node to request network participation approval from the head node;
   allowing the head node to request an address of the mobile node from the management node;
   allowing the management node to assign the address of the mobile node to the head node; and
   allowing the head node to approve network participation of the mobile node.

2. An address assignment method of a mobile node, for hierarchical routing in a low-power wireless personal area network (LoWPAN), comprising:
   (a) classifying a plurality of fixed nodes in a hierarchy;
   (b) designating a management node and a head node among the fixed nodes, the head node having a lower level than the level of the management node;
   (c) determining if a mobile node can communicate with the head node; and
   (d) assigning an address to the mobile node through a neighboring head node, which can communicate with the mobile node, when the mobile node cannot communicate with the head node,
   wherein step (d) comprises:
   requesting network participation from the neighboring head node;
   allowing the neighboring head node to request to the management node a change of the head node of the mobile node;
   allowing the management node to approve the change of the head node and to assign an address of the mobile node; and
   allowing the neighboring head node to approve network participation of the mobile node.

3. The address assignment method of claim 1, wherein the neighboring head node and the head node are disposed on the same level.

4. The address assignment method, of claim 1, wherein the neighboring head node and the head node are in charge of at least one mobile node.

5. The address assignment method of claim 1, wherein the mobile node is disposed on a lower level than the head node to be divided from an address field of the fixed node.

6. The address assignment method of claim 1, wherein Internet Protocol (IP) addresses of the management node, the head node and the mobile node are based on Internet Protocol version 6 (IPv6).

7. A packet transmission method of a mobile node for hierarchical routing in a LoWPAN, comprising:
   (a) classifying a plurality of fixed nodes in a hierarchy;
   (b) designating a management node and a head node among the fixed nodes, the head node having a lower level than the level of the management node;
   (c) determining if a mobile node can communicate with the head node;
   (d) assigning an address to the mobile node through, a neighboring head node, which can communicate with the mobile node when the mobile node cannot communicate with the head node; and
   (e) allowing the mobile node to send a packet through the neighboring head node,
   wherein the packet transmission method further comprises the following steps when the mobile node can communicate with the head node in step (c):
   allowing the mobile node to request network participation approval from the head node;
   allowing the head node to request an address of the mobile node from the management node;
   allowing the management node to assign the address of the mobile node to the head node;
   allowing the head node to approve network participation of the mobile node; and
   allowing the head node to send the packet through the head node.

8. A packet transmission method of a mobile node for hierarchical routing in a LoWPAN, comprising:
   (a) classifying a plurality of fixed nodes in a hierarchy;
   (b) designating a management node and a head node among the fixed nodes, the head node having a lower level than the level of the management node;
   (c) determining if a mobile node can communicate with the head node;
   (d) assigning an address to the mobile node through a neighboring head node which can communicate with the mobile node when the mobile node cannot communicate with the head node; and
   (e) allowing the mobile node to send a packet through the neighboring head node,
   wherein step (d) comprises:
   requesting network participation approval from the neighboring head node;
   allowing the neighboring head node to request to the management node a change of the head node of the mobile node;
   allowing the management node to approve the change of the head node and to assign an, address of the mobile node; and
   allowing the neighboring head node to approve network participation of the mobile node.

9. The packet transmission method of claim 7, wherein the packet has four address fields when the mobile node is at least one of a source node and a destination node.

10. The packet transmission method of claim 9, wherein the four fields comprise a source node address field, a first intermediate node address field, a destination node address field and a second intermediate node address field.

11. The packet transmission method of claim 10, wherein addresses of the first and second intermediate nodes are at least one of addresses of the management node and addresses of the head node.

12. The address assignment method of claim 2, wherein the neighboring head node and the head node are disposed on the same level.

13. The address assignment method of claim 2, wherein the neighboring head node and the head node are in charge of at least one mobile node.

14. The address assignment method of claim 2, wherein the mobile node is disposed on a lower level than the head node to be divided from an address field of the fixed node.

15. The address assignment method of claim 2, wherein Internet Protocol (IP) addresses of the management node, the head node and the mobile node are based on Internet Protocol version 6 (IPv6).

16. The packet transmission method of claim 8, wherein the packet has four address fields when the mobile node is at least one of a source node and a destination node.

17. The packet transmission method of claim 16, wherein the four fields comprise a source node address field, a first intermediate node address field, a destination node address field and a second intermediate node address field.

18. The packet transmission method of claim 17, wherein addresses of the first and second intermediate nodes are at least one of addresses of the management node and addresses of the head node.

* * * * *